(12) United States Patent
Matranga et al.

(10) Patent No.: US 6,489,831 B1
(45) Date of Patent: Dec. 3, 2002

(54) CMOS TEMPERATURE SENSOR

(75) Inventors: Giovanni Matranga, Catania (IT); Luca Lo Coco, Monreale (IT); Giuseppe Compagno, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/650,023

(22) Filed: Aug. 28, 2000

(30) Foreign Application Priority Data

Aug. 31, 1999 (EP) .............................. 99830540

(51) Int. Cl.[7] .............................. H01L 35/00
(52) U.S. Cl. ...................... 327/512; 374/176
(58) Field of Search .................. 327/512, 513; 374/173, 176

(56) References Cited

U.S. PATENT DOCUMENTS

| | | | |
|---|---|---|---|
| 5,149,199 A | * | 9/1992 | Kinoshita et al. ............ 327/512 |
| 5,795,069 A | * | 8/1998 | Mattes et al. ................ 327/513 |
| 5,835,553 A | * | 11/1998 | Suzuki ........................ 377/25 |

OTHER PUBLICATIONS

Document No. XP 000691809. Brokaw, Paul. "A Temperature Sensor With Single Resistor Set–Point Programming" Dec. 1996 pp. 1908–1915.
Document No. XP 000701404. Szekely, Vladimir, et al. "Sensors For On–Line Thermal Monitoring of VLSI Circuits" Sep. 1997 pp. 270–276.
Document No. XP 004140066. Bianchi, R.A., et al. "CMOS Compatible Temperature Sensor Based on the Lateral Bipolar Transistor for Very Wide Temperature Range Applications" 1998 pp. 3–9.

* cited by examiner

*Primary Examiner*—Kenneth B. Wells
(74) *Attorney, Agent, or Firm*—Lisa K. Jorgenson; Allen, Dyer, Doppelt, Milbrath & Gilchrist, P.A.

(57) ABSTRACT

A CMOS temperature sensor includes a first circuit portion for generating a voltage signal whose value increases with the temperature to be sensed, and a second circuit portion for generating an electric voltage signal whose value decreases with the temperature to be sensed. A comparator is provided as an output stage for comparing the values of both voltage signals. The generator element of the second circuit portion is a vertical bipolar transistor connected in a diode configuration.

33 Claims, 4 Drawing Sheets

CMOS TEMPERATURE SENSOR

FIELD OF THE INVENTION

The present invention relates to integrated circuits, and, more particularly, to a CMOS temperature sensor adapted for operation over a wide range of supply voltages. For example, the temperature sensor according to the present invention can operate within a range of 1.8 V to 7 V at a current consumption of about 2.8 mA.

BACKGROUND OF THE INVENTION

Temperature sensors are incorporated in a number of electronic circuits for a variety of purposes. For example, dissipation by integrated circuits exceeding a safe temperature limit needs to be signaled so that the dissipation can be controlled. In addition, the operating temperature range for a particular electronic system may have to be limited.

More particularly, temperature detectors have been used as security arrangements for monitoring the operating temperature of non-volatile EEPROM memories used in Smartcards. Smartcards are plastics cards having an integrated circuit, such as a memory circuit or a microcontroller, embedded therein. These cards are increasing in popularity for a variety of applications, including credit/debit cards, POS cards, telephone cards, access control cards, etc.

Smartcards are to meet strict security requirements, and this has resulted in a constant development of intrusion-defeating arrangements for their improved effectiveness. One possible form of intrusion is to expose the card to a heat source to alter the operation of the integrated circuit contained therein. Many intrusions into smart cards can be attempted by a technique known as differential power analysis (DPA), which is readily understood by one skilled in the art.

Also known is the use of hardware or firmware security arrangements. These arrangements are being regularly designed for improved security. Such arrangements include using advanced 0.35-micron technologies to minimize both the size and the consumption rate of the integrated circuit, as well as relative variations in its operational parameters. When combined with a screening metallization level, this makes DPA attempts less likely to succeed.

Other such security arrangements include using specific operational software for the internal timing of the integrated circuit, whereby high variability is introduced in the operation scans when such operations are carried out. A modular design may also be used which enables the circuit hardware to be quickly modified for immediately counteracting new forms of intrusive attempts.

Yet another security arrangement includes using a series of hardware mechanisms, such as thermal protectors, for example, which enable the resident integrated circuit applications to detect and react as appropriate to the occurrence of any operational conditions which may look like an intrusive attempt or is actually a factual indication of an intrusive attempt.

There is a need to improve resident thermal protectors for an integrated circuit requiring such protection. In general, temperature can be measured in integrated circuits on the basis of a voltage differential DVbe which is proportional to temperature (PTAT), and a voltage value which is proportional to Vbe and decreases linearly with temperature (CTAT). In other instances, a comparison of a temperature-stable reference voltage which may be obtained from a bandgap generator or by compensation between a voltage VPTAT and a voltage VCTAT, and a voltage that varies linearly with temperature, is performed.

There also exist circuits effecting a direct comparison of a voltage which increases linearly with temperature and a voltage which decreases linearly with temperature. Such is the case, for example, with the circuit shown schematically in FIG. 1, which illustrates a temperature sensor formed with bipolar technology. This type of sensor is described in IEEE Journal of Solid-State Circuits, Vol. 31, No. 12, December 1996, page 1912, for example.

The sensor of FIG. 1 illustrates how a voltage VPTAT and a voltage VCTAT can be compared to cause the output to switch over at a desired temperature. In all cases, an analog signal is generated which will cross zero at the desired temperature.

A further prior art embodiment implementing a temperature sensor is shown schematically in FIG. 2. This embodiment shows that a voltage VPTAT and voltage VCTAT can be used to generate two currents. A first current is temperature stable, and a second current is linearly dependent on the temperature. The two currents are compared together to determine whether a desired temperature has been reached. The circuit shown in FIG. 2 is implemented with CMOS technology, and is described in an article by Szekely et al., IEEE Transactions on VLSI Systems, Vol. 5, No. 3, September 1997, page 270, for example.

The circuit illustrated in FIG. 2, although achieving its objective, has a drawback in that generated currents are dependent on the resistance of a resistor R1, which is usually a few megaohms. However, this value can have a substantial process spread.

In addition, the thermal coefficient of the resistor R1 makes generating currents with a desired dependence on temperature difficult to achieve. To overcome such problems, polysilicon resistors are used which exhibit negligible process and thermal coefficient variations. However, in view of the low resistivity per circuit area square (approximately 1–6 Ohms/square) of such resistors, very large silicon areas or relatively large currents must be used, resulting in increased cost.

SUMMARY OF THE INVENTION

In view of the foregoing background, it is therefore an object of the present invention to provide a temperature sensor with CMOS technology that has adequate structural and functional features to allow a desired temperature to be detected rapidly and accurately, while reducing the area requirements for the sensor.

This and other objects, features and advantages in accordance with the present invention are provided using CMOS elements in place of a resistor commonly used by conventional sensors for generating the comparison currents.

The CMOS temperature sensor includes a first circuit portion for generating an increasing voltage as the temperature to be sensed increases, and a second circuit portion for generating a decreasing voltage as the temperature to be sensed increases. A comparator compares such voltage values together and outputs an electric signal based upon a predetermined temperature being reached.

BRIEF DESCRIPTION OF THE DRAWINGS

The features and advantages of a temperature sensor according to the present invention can be best appreciated from the following description of an embodiment thereof, given by way of a non-limitative example with reference to the accompanying drawings.

DETAILED DESCRIPTION OF THE PREFERRED EMBODIMENTS

Figure 3:
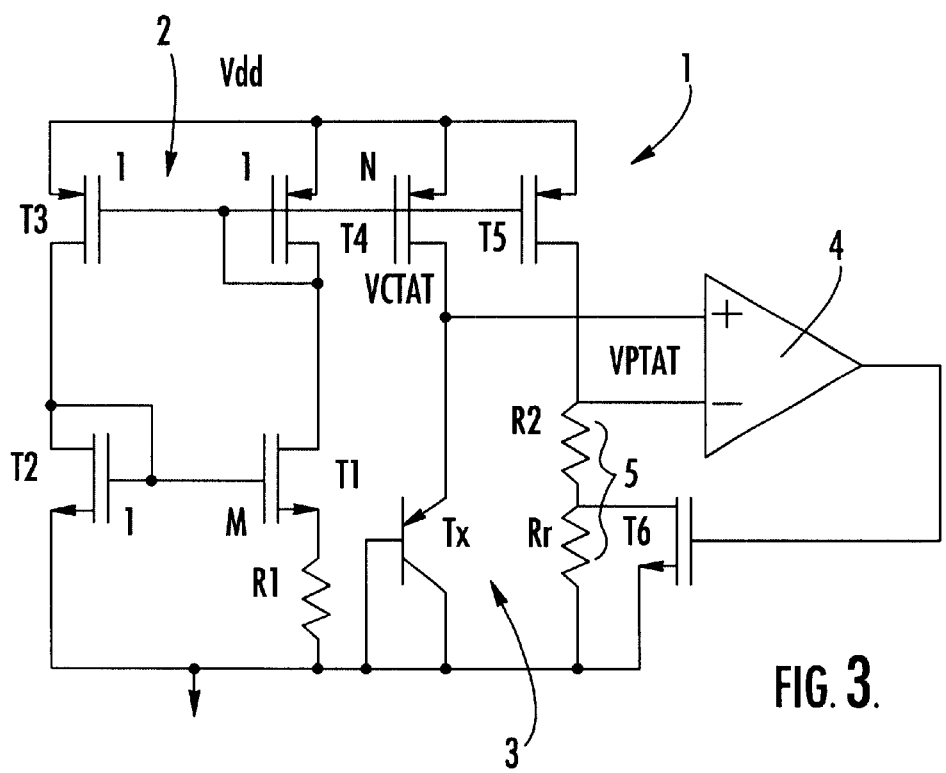
FIG. 3 is a schematic diagram of a temperature sensor implemented with CMOS technology according to the present invention.

Referring to the drawing figures, and in particular to the example of FIG. 3, a temperature sensor implemented with CMOS or CMOS-compatible technology is generally indicated by reference 1. The temperature sensor is intended, particularly, but not exclusively, for incorporation into a fraud-counteracting device as installed in a smart card. The smart card contains an integrated microcontroller or an integrated memory circuit.

Figure 1:
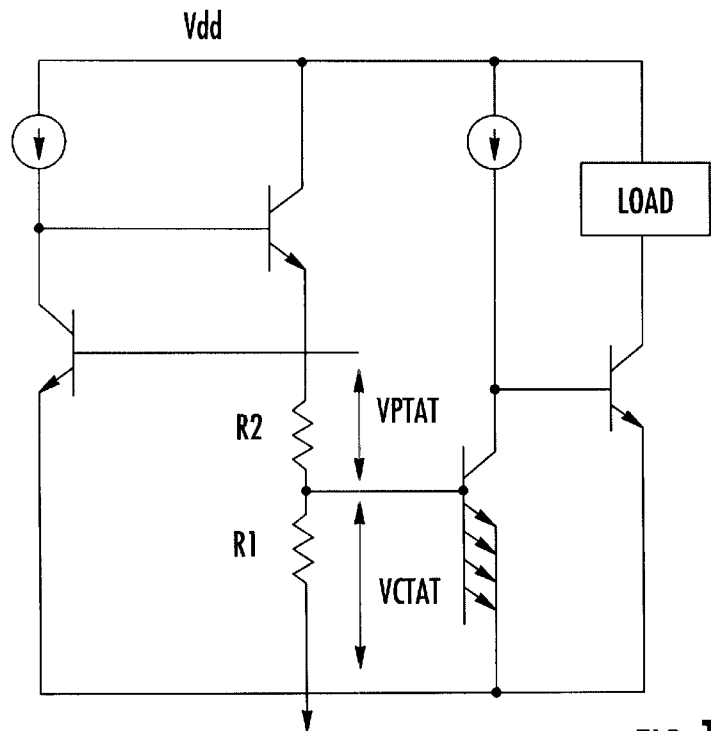
FIG. 1 is a schematic diagram of a temperature sensor implemented with bipolar technology according to the prior art.
Figure 2:
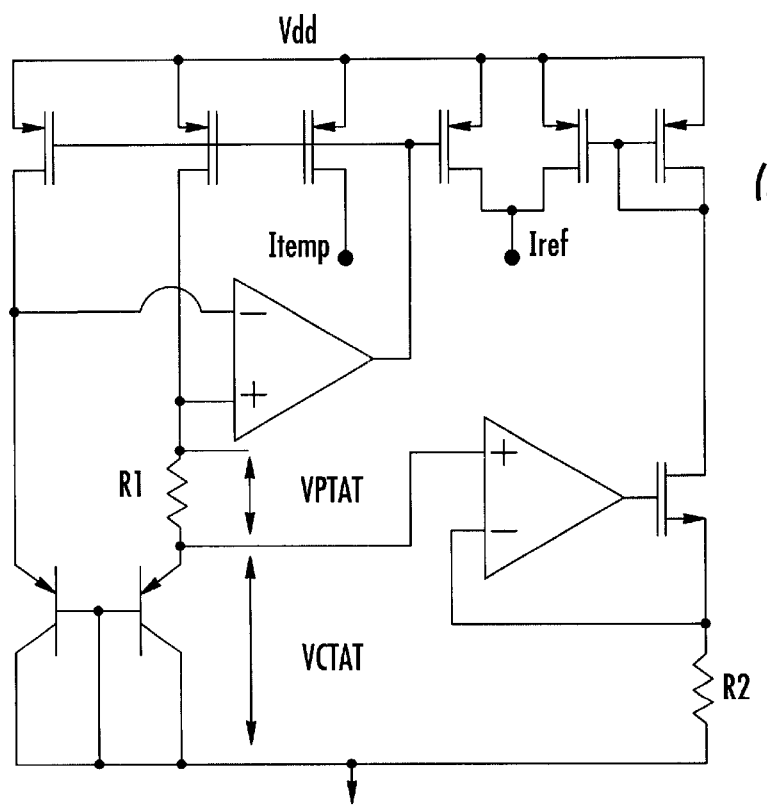
FIG. 2 is a schematic diagram of a temperature sensor implemented with CMOS technology according to the prior art.
Figure 4:
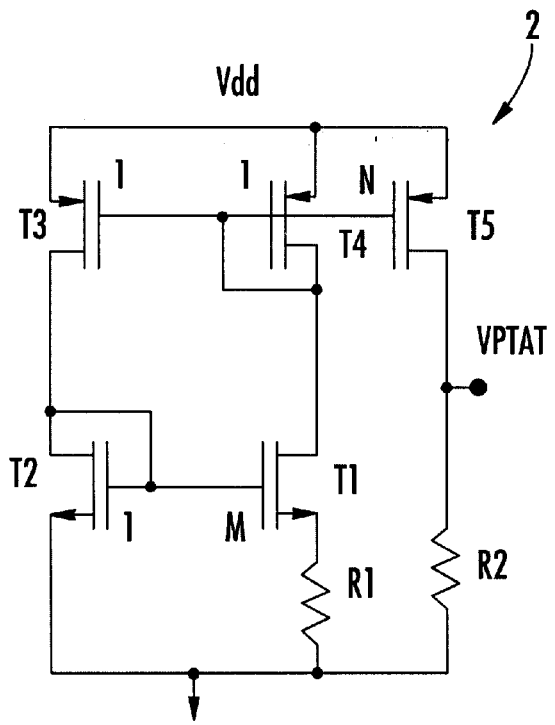
FIG. 4 is a schematic diagram of the first circuit portion of the temperature sensor illustrated in FIG. 3.

The circuit 1 comprises a first circuit portion, generally denoted by reference 2, which is adapted to generate a voltage that increases linearly with the temperature to be detected. This first circuit portion 2 is shown in detail in FIG. 4, and can be regarded as being the equivalent of a bandgap voltage generator adapted to generate an output voltage VPTAT proportional to absolute temperature.

The circuit portion 2 comprises a first pair of NMOS transistors T1, T2 having their gate terminals connected together. The size of transistor T1 is M times larger than that of transistor T2, which may be of unit area.

A second pair of PMOS transistors T3, T4 have their gate terminals connected together. This second transistor pair T3, T4 is connected to the first transistor pair T1, T2 to form PMOS/NMOS complementary pairs T3, T2 and T4, T1, respectively. The complementary pairs T3, T2 and T4, T1 are connected between a first supply voltage reference Vdd and a second voltage reference, e.g., ground GND. More particularly, a resistor R1 interconnects the source terminal of the transistor T1 and the ground reference.

A fifth transistor T5 of the PMOS type is connected between the supply reference Vdd and ground GND via a resistor R2. This transistor has its gate terminal connected to the gate terminals of the second transistor pair T3, T4. The drain terminal of the fifth transistor represents the output of the circuit portion 2.

The circuit 1 further comprises a second circuit portion, generally indicated by reference 3, which is adapted to generate a linearly decreasing voltage with the temperature to be detected. Advantageously, the second circuit portion 3 preferably comprises a transistor Tx, which is of the vertical bipolar type, and is diode connected as an element which provides a voltage value decreasing linearly with the temperature to be detected. The transistor Tx has its base and emitter terminals connected to ground GND, and has its collector connected to a comparator 4.

By adjustment of the resistance value of the resistor R2 in the first circuit portion 2, a voltage can be generated which increases linearly with temperature up to a value that equals the value of the voltage generated by the bipolar transistor Tx at the target temperature.

The circuit 1 also comprises a comparator 4 having two inputs. A first (−) comparator input is connected to the output of the first circuit portion 2 and receives the voltage signal VPTAT. The second (+) input of the comparator 4 is connected to the output of the second circuit portion 3 and receives a voltage signal VCTAT. The output of the second circuit portion 3 corresponds to the collector terminal of the transistor Tx.

Advantageously, the two voltages, VPTAT and VCTAT, are compared in the comparator 4, the latter detecting when they are of the same value and, accordingly, determining when the temperature of the integrated circuit which accommodates the sensor reaches a predetermined target value.

The sensor 1 only operates on resistance and eliminates all the problems connected with process spread and/or the resistor thermal coefficients. A distinctive feature of the first circuit portion 2 is to be noted. Assuming the NMOS transistors are to be operated in the sub-threshold range, an analytical expression for the output voltage VPTAT is as follows:

$$VPTAT=(S5/S4)*(R2/R1)*Vt*L((S3*S1)/(S4*S2))$$

where:

Vt=kT/q, with k being Boltzman's constant and q the electron charge; and

Sx is the aspect ratio (W/L) of a transistor.

By using a circuit portion 2 whose operation is based on transistors being operated in the sub-threshold range, the consumption of the sensor 1 can be kept quite low. The sensor 1 consumption would amount to about 3 mA, including the consumption of the comparator 4.

The sensor according to the present invention further provides a hysteresis of the switching temperature to make it more accurate, even though this is not an essential requirement to the sensor operation. In other words, the structure of the sensor 1 provides a hysteresis of the switching temperature of the comparator 4. This hysteressis is introduced to prevent possible oscillations in the comparator output and make the sensor 1 immune to noise. Since temperature can only change very slowly, the triggering time might not be well defined, and external noise could cause a series of false switchings before the system attains steady state.

The inverting (−) input of the comparator 4 is connected to the ground reference GND through a resistive divider 5 which comprises at least one resistor pair R2, Rr. An NMOS transistor T6 is connected between the output of the comparator 4 and the interconnecting node between the resistors in the divider 5. More particularly, the gate terminal of transistor T6 is driven by the output of the comparator 4. The drain terminal of transistor T6 is connected to the node between the resistors. The source terminal is connected to the ground reference.

Figure 5:
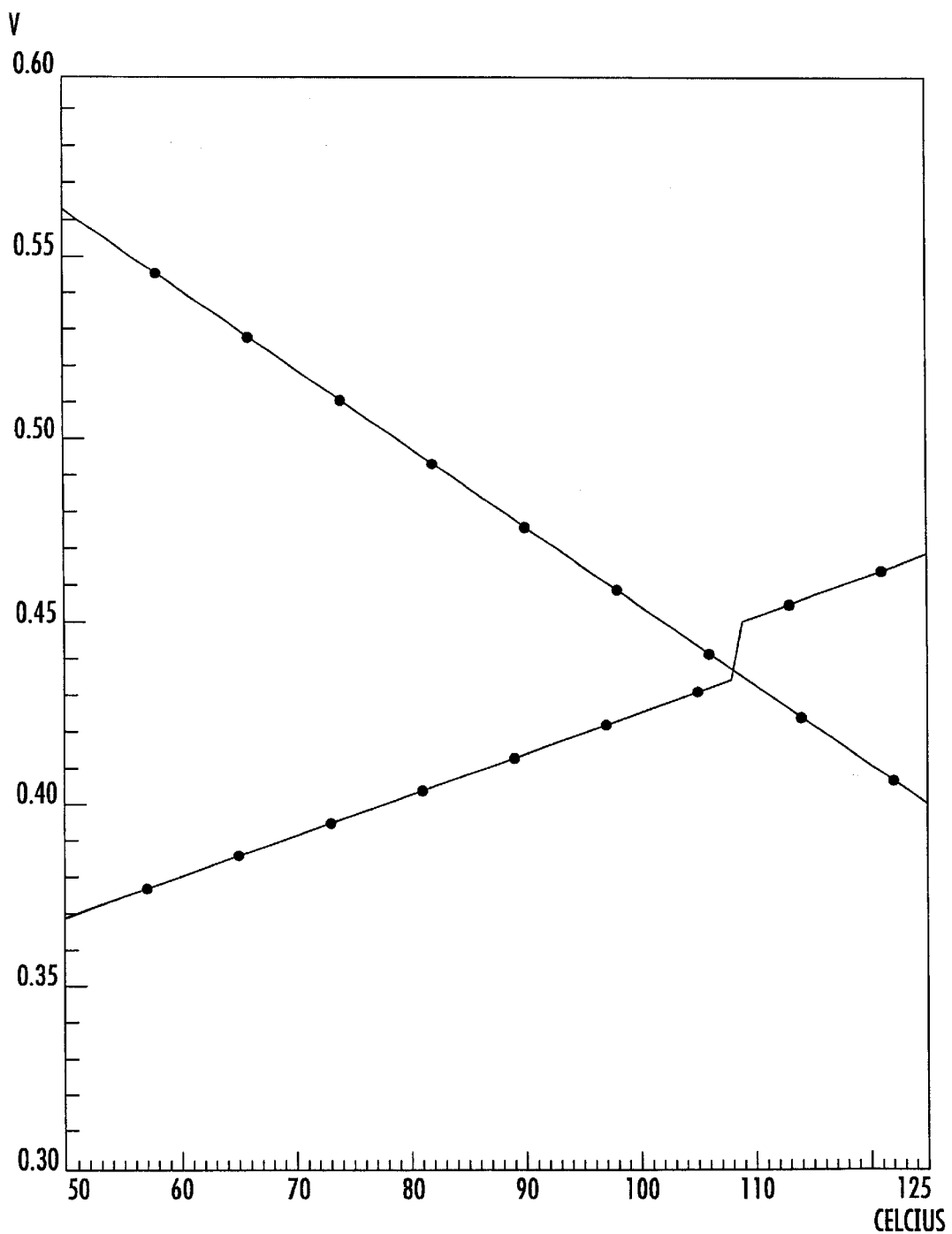
FIG. 5 is a voltage vs. temperature plot of two voltage signals of the temperature sensor according to the present invention.
Figure 6:
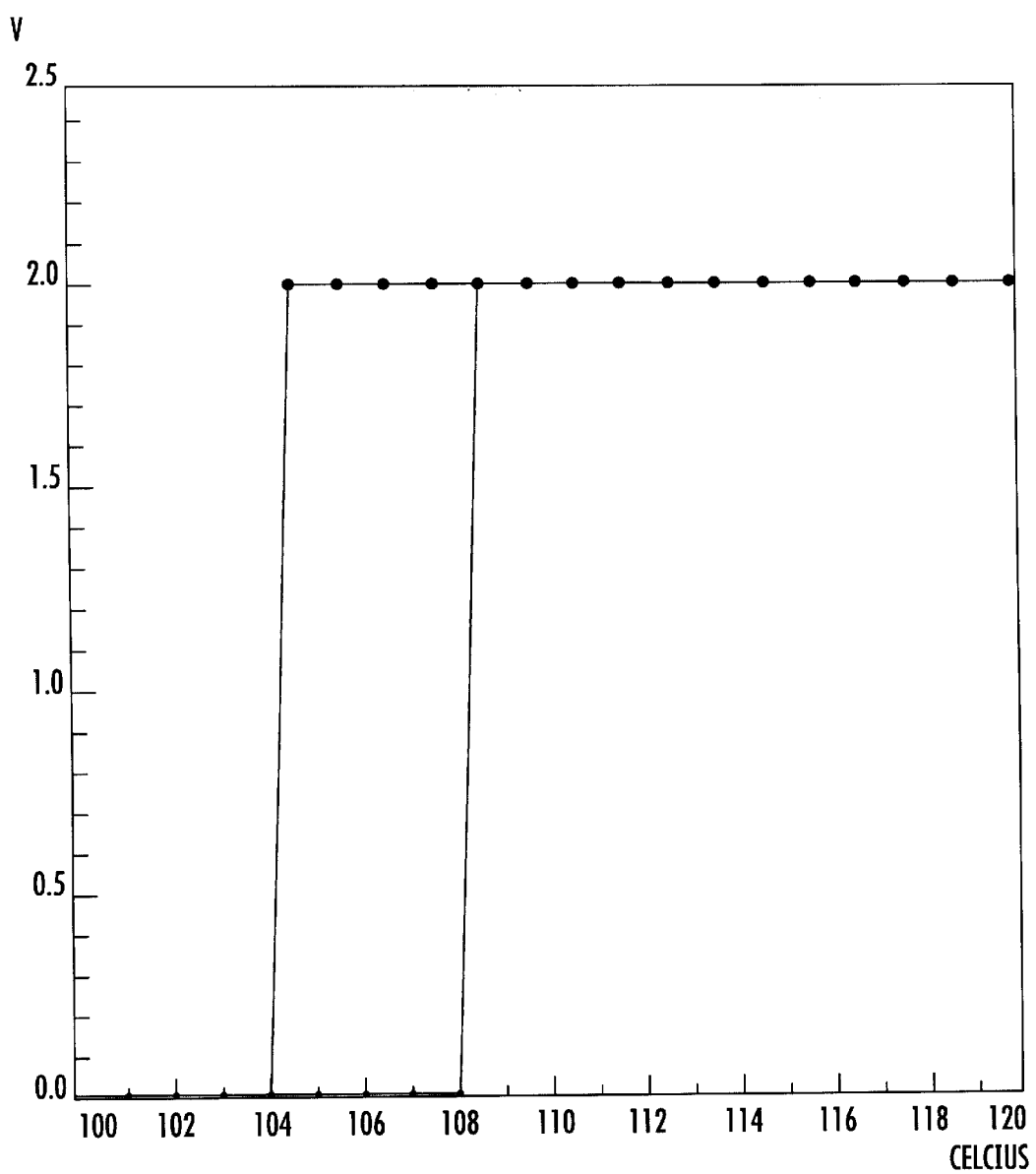
FIG. 6 is a voltage vs. temperature plot of the hysteresis output of the temperature sensor according to the present invention.

The resistor Rr, which is short-circuited by the transistor T6 at temperatures below the triggering temperature, would be connected in as the comparator 4 switches over. Thus, the voltage value VPTAT is increased by approximately ten millivolts. This resistor Rr will again be short-circuited as temperature drops and the comparator 4 switches over again. In this way, a hysteresis of about 2–3° C. can be obtained in the triggering temperature, as illustrated by the plots in FIGS. 5 and 6 showing the values of the voltages VPTAT and VCTAT versus temperature.

What is claimed is:

1. A temperature sensor comprising:
a first circuit portion for generating a first signal having a first voltage value that increases with a temperature to be sensed;
a second circuit portion comprising a vertical bipolar transistor connected in a diode configuration for generating a second signal having a second voltage value that decreases with the temperature to be sensed; and
a comparator connected to said first and second circuit portions for comparing the first and second voltage values.

2. A temperature sensor according to claim 1, wherein said first circuit portion comprises a bandgap voltage generator.

3. A temperature sensor according to claim 1, wherein said first circuit portion comprises:
a first pair of transistors of a first conductivity type, each transistor comprising a control terminal connected together; and
a second pair of transistors of a second conductivity type, each transistor comprising a control terminal connected together, said second pair of transistors being connected to said first pair of transistors.

4. A temperature sensor according to claim 3, wherein said first circuit portion further comprises a first resistive element connected to said first pair of transistors.

5. A temperature sensor according to claim 3, wherein said first circuit portion further comprises a fifth transistor of the second conductivity type, said fifth transistor comprising a control terminal connected to said control terminals of said second pair of transistors.

6. A temperature sensor according to claim 5, further comprising a second resistive element connected to a first voltage reference; and wherein said fifth transistor comprises a conduction terminal connected to said second resistive element.

7. A temperature sensor according to claim 1, wherein said second circuit portion comprises a bipolar transistor comprising a base, collector and an emitter, said base and collector being connected to a first voltage reference and said emitter being connected to a first input of said comparator.

8. A temperature sensor according to claim 1, further comprising a hysteresis element connected between an output of said comparator and a second input of said comparator.

9. A temperature sensor according to claim 8, further comprising a third resistive element connected between the second input of said comparator and a first voltage reference; and wherein said hysteresis element comprises a sixth transistor of the first conductivity type comprising a control terminal being driven by the output of said comparator, said sixth transistor being connected in parallel to said third resistive element.

10. A temperature sensor according to claim 9, wherein said sixth transistor comprises an NMOS transistor.

11. An integrated temperature sensor comprising:
a first circuit portion for generating a first signal having a first voltage value that increases with a temperature to be sensed, said first circuit portion comprising
a first pair of MOS transistors of a first conductivity type, each MOS transistor comprising a gate connected together, and
a second pair of MOS transistors of a second conductivity type, each MOS transistor comprising a gate connected together, said second pair of MOS transistors being connected to said first pair of transistors;
a second circuit portion for generating a second signal having a second voltage value that decreases with the temperature to be sensed, said second circuit portion comprising a bipolar transistor connected in a diode configuration; and
a comparator having a first input connected to said second circuit portion and a second input connected to said first circuit portion for comparing the first and second voltage values.

12. An integrated temperature sensor according to claim 11, wherein said first circuit portion further comprises a first resistive element connected to said first pair of MOS transistors.

13. An integrated temperature sensor according to claim 11, wherein said first circuit portion further comprises a fifth MOS transistor of the second conductivity type, said fifth MOS transistor comprising a gate connected to said gates of said second pair of MOS transistors.

14. An integrated temperature sensor according to claim 13, further comprising a second resistive element connected to a first voltage reference; and wherein said fifth MOS transistor comprises a drain connected to said second resistive element.

15. An integrated temperature sensor according to claim 11, wherein said bipolar transistor comprises a vertical transistor.

16. An integrated temperature sensor according to claim 11, wherein said bipolar transistor comprises a base, collector and an emitter, said base and collector being connected to a first voltage reference and said emitter being connected to a second input of said comparator.

17. An integrated temperature sensor according to claim 11, further comprising a hysteresis element connected between an output of said comparator and the second input of said comparator.

18. An integrated temperature sensor according to claim 17, further comprising a third resistive element connected between the second input of said comparator and a first voltage reference; and wherein said hysteresis element comprises a sixth MOS transistor of the first conductivity type comprising a gate being driven by the output of said comparator, said sixth MOS transistor being connected in parallel to said third resistive element.

19. An integrated temperature sensor according to claim 11, wherein the first conductivity-type comprises an N type conductivity, and the second conductivity type comprises a P type conductivity.

20. An electronic fraud-counteracting device for a smart card comprising at least one temperature sensor, the at least one temperature sensor comprising:
a first circuit portion for generating a first signal having a first voltage value that increases with a temperature to be sensed;
a second circuit portion comprising a vertical bipolar transistor connected in a diode configuration for generating a second signal having a second voltage value that decreases with the temperature to be sensed; and
a comparator connected to said first and second circuit portions for comparing the first and second voltage values.

21. An electronic fraud-counteracting device according to claim 20, wherein said first circuit portion comprises a bandgap voltage generator.

22. An electronic fraud-counteracting device according to claim 20, wherein said first circuit portion comprises:
- a first pair of transistors of a first conductivity type, each transistor comprising a control terminal connected together; and
- a second pair of transistors of a second conductivity type, each transistor comprising a control terminal connected together, said second pair of transistors being connected to said first pair of transistors.

23. An electronic fraud-counteracting device according to claim 22, wherein said first circuit portion further comprises a first resistive element connected to said first pair of transistors.

24. An electronic fraud-counteracting device according to claim 22, wherein said first circuit portion further comprises a fifth transistor of the second conductivity type, said fifth transistor comprising a control terminal connected to said control terminals of said second pair of transistors.

25. An electronic fraud-counteracting device according to claim 24, further comprising a second resistive element connected to a first voltage reference; and wherein said fifth transistor comprises a conduction terminal connected to said second resistive element.

26. An electronic fraud-counteracting device according to claim 20, wherein said second circuit portion comprises a bipolar transistor comprising a base, collector and an emitter, said base and collector being connected to a first voltage reference and said emitter being connected to a first input of said comparator.

27. An electronic fraud-counteracting device according to claim 20, further comprising a hysteresis element connected between an output of said comparator and a second input of said comparator.

28. An electronic fraud-counteracting device according to claim 27, further comprising a third resistive element connected between the second input of said comparator and a first voltage reference; and wherein said hysteresis element comprises a sixth transistor of the first conductivity type comprising a control terminal being driven by the output of said comparator, said sixth transistor being connected in parallel to said third resistive element.

29. An electronic fraud-counteracting device according to claim 28, wherein said sixth transistor comprises an NMOS transistor.

30. A method for sensing temperature in an integrated circuit comprising:
- generating a first signal having a first voltage value that increases with a temperature to be sensed;
- generating a second signal having a second voltage value that decreases with the temperature to be sensed, the second signal being generated using a vertical bipolar transistor connected in a diode configuration; and
- comparing the first and second voltage values.

31. A method according to claim 30, wherein comparing comprises determining if the temperature to be sensed reaches a predetermined value.

32. A method according to claim 30, further comprising providing a hysteresis of a switching temperature based upon the comparison of the first and second voltage values.

33. A method according to claim 30, wherein generating the first signal is generated using a first circuit portion comprising a bandgap voltage generator.

* * * * *